United States Patent
van Tooren et al.

(10) Patent No.: US 11,718,044 B2
(45) Date of Patent: Aug. 8, 2023

(54) FIXTURES AND METHODS FOR INDUCTION WELDING

(71) Applicant: Rohr, Inc., Chula Vista, CA (US)

(72) Inventors: Michael van Tooren, San Diego, CA (US); Charles Novak, Moreno Valley, CA (US); Fassil Ghebremichael, Irvine, CA (US); Dominic J. Elliott, Riverside, CA (US); Jonathan S. Huang, Pasadena, CA (US); Jeffrey Woods, Beaumont, CA (US)

(73) Assignee: Rohr, Inc., Chula Vista, CA (US)

( * ) Notice: Subject to any disclaimer, the term of this patent is extended or adjusted under 35 U.S.C. 154(b) by 121 days.

(21) Appl. No.: 17/341,216

(22) Filed: Jun. 7, 2021

(65) Prior Publication Data
US 2022/0388254 A1 Dec. 8, 2022

(51) Int. Cl.
*B29C 65/00* (2006.01)
*B29C 65/36* (2006.01)

(52) U.S. Cl.
CPC .... *B29C 66/81811* (2013.01); *B29C 65/3668* (2013.01)

(58) Field of Classification Search
CPC ............. B29C 65/3668; B29C 66/81811
See application file for complete search history.

(56) References Cited

U.S. PATENT DOCUMENTS

| 5,047,605 A * | 9/1991 | Ogden ............. B29C 66/91231 |
| | | 219/667 |
| 5,635,094 A | 6/1997 | Hansen |
| 5,660,669 A | 8/1997 | Mittleider |
| 2010/0206469 A1* | 8/2010 | Van Wijngaarden ....................... |
| | | B29C 66/43441 |
| | | 156/499 |
| 2016/0375629 A1* | 12/2016 | Matsen .................. B29C 65/04 |
| | | 156/245 |
| 2020/0206469 A1 | 7/2020 | Morris |
| 2021/0039332 A1 | 2/2021 | Dichiara |
| 2021/0039334 A1 | 2/2021 | Dichiara |
| 2021/0040575 A1 | 2/2021 | Ferry |

FOREIGN PATENT DOCUMENTS

| EP | 3772406 A1 | 2/2021 |
| GB | 849672 A | 9/1960 |

OTHER PUBLICATIONS

EP search report for EP22177630.5 dated Dec. 8, 2022.

\* cited by examiner

*Primary Examiner* — Daniel McNally
(74) *Attorney, Agent, or Firm* — Getz Balich LLC

(57) ABSTRACT

An assembly is provided for induction welding. This induction welding assembly includes a fixture. The fixture includes a first support structure and a second support structure. The second support structure includes a frame and a plurality of trunks. Each of the trunks is connected to and repositionable on the frame. The fixture is configured to secure a workpiece vertically between the first support structure and the second support structure using the trunks during induction welding of the workpiece.

18 Claims, 13 Drawing Sheets

FIXTURES AND METHODS FOR INDUCTION WELDING

BACKGROUND

1. Technical Field

This disclosure relates generally to induction welding and, more particularly, to fixtures and method for induction welding a workpiece.

2. Background Information

A workpiece may be induction welded to bond members of that workpiece together. Various fixtures are known in the art for induction welding. Typically, an induction welding fixture is specifically tailored for induction welding a single joint on the workpiece. Therefore, a workpiece with multiple weld joints may require multiple different fixtures. Alternatively, a single fixture may be configured with multiple stations for induction welding the workpiece at different locations. Such a multi-station fixture may be arranged with the workpiece such that an induction welding coil can weld the workpiece without moving the workpiece or the fixture. While the known fixtures have various benefits, these fixtures may be expensive to produce and tedious to setup for induction welding. There is a need in the art therefore for a more versatile fixture for induction welding.

SUMMARY OF THE DISCLOSURE

According to an aspect of the present disclosure, an assembly is provided for induction welding. This induction welding assembly includes a fixture, where the fixture includes a first support structure and a second support structure. The second support structure includes a frame and a plurality of trunks. Each of the trunks is connected to and repositionable on the frame. The fixture is configured to secure a workpiece vertically between the first support structure and the second support structure using the trunks during induction welding of the workpiece.

According to another aspect of the present disclosure, an induction welding method is provided. During this method, a fixture and a workpiece are arranged together. The fixture includes a first support structure and a second support structure. The second support structure includes a frame and a plurality of trunks. Each of the trunks is connected to and repositionable on the frame. The workpiece is secured vertically between the first support structure and the second support structure using the plurality of trunks. A first member of the workpiece is induction welded to a second member of the workpiece using an induction welding coil while the workpiece is secured vertically between first support structure and the second support structure.

According to another aspect of the present disclosure, another induction welding method is provided. During this method, a workpiece is secured with a fixture vertically between a first support structure and a second support structure. The workpiece is induction welded at a first position using an induction welding coil while the workpiece is secured vertically between the first support structure and the second support structure. The induction welding of the workpiece at the first position includes induction welding a first member of the workpiece to a second member of the workpiece. The workpiece is released from the fixture. The workpiece and the fixture are rearranged to move the workpiece and the fixture relative to one another. The workpiece is secured with the fixture vertically between the first support structure and the second support structure. The workpiece is induction welded at a second position using the induction welding coil while the workpiece is secured vertically between the first support structure and the second support structure.

According to another aspect of the present disclosure, another assembly is provided for induction welding. This induction welding assembly includes a fixture. The fixture includes a first support structure and a second support structure. The second support structure includes a frame and a plurality of support blocks. Each of the support blocks is connected to and repositionable on the frame. The fixture is configured to secure a workpiece vertically between the first support structure and the support blocks during induction welding of the workpiece.

According to another aspect of the present disclosure, another assembly is provided for induction welding. This induction welding assembly includes a fixture. The fixture includes a first support structure and a gantry. The gantry includes a second support structure and is configured to move along a workpiece. The fixture is configured to clamp the workpiece vertically between the first support structure and the second support structure during induction welding of the workpiece.

According to still another aspect of the present disclosure, another assembly is provided for induction welding. This induction welding assembly includes a fixture. The fixture includes a heat management device and a heat sink. The heat management device is configured as a replaceable body within the fixture. The heat sink is configured as a replaceable body within the fixture. The heat sink is vertically adjustable. The fixture is configured to secure a first member of a workpiece with a second member of the workpiece vertically between the heat management device and the heat sink while the first member of the workpiece is induction welded to the second member of the workpiece.

The induction welding coil may be located in a gap laterally between a first of the trunks and a second of the trunks.

The induction welding coil may translate longitudinally along a row of the trunks while induction welding the first member of the workpiece to the second member of the workpiece.

The securing of the workpiece may include adjusting a vertical position of at least a first of the trunks.

The induction welding method may include: releasing the workpiece from the fixture; moving the fixture from a first position to a second position along the workpiece; securing the workpiece at the second position vertically between the first support structure and the second support structure using the trunks; and induction welding the workpiece at the second position using the induction welding coil while the workpiece is secured vertically between first support structure and the second support structure.

The arranging the fixture and the workpiece together may include arranging the fixture with the workpiece.

The arranging the fixture and the workpiece together may include arranging the workpiece with the fixture.

The second support structure may include a plurality of adjustable trunks. The fixture may be configured to clamp the workpiece vertically between the first support structure and the adjustable trunks during induction welding of the workpiece.

The fixture may be configured to clamp a first member of the workpiece and a second member of the workpiece vertically between the first support structure and the second support structure using the trunks as the second member of the workpiece is induction welded to the first member of the workpiece.

The first support structure may include a heat management device configured to contact a first side of the workpiece. The second support structure may also include a heat sink configured to contact a second side of the workpiece. The fixture may be configured to secure the workpiece vertically between the heat management device and the heat sink.

The first support structure may also include an actuator configured to push the heat management device against the workpiece for clamping the workpiece between the heat management device and the heat sink.

The first support structure may also include a base. The heat management device and the actuator may be disposed within a channel in the base.

The actuator may include an expandable pressure vessel.

The trunks may vertically engage and provide a backstop for the heat sink.

The frame may include a first beam and a second beam. The trunks may include a first trunk and a second trunk. The first trunk may be connected to and repositionable on the first beam. The second trunk may be connected to and repositionable on the second beam. The first trunk may be laterally separated from the second trunk by a channel configured to receive an induction welding coil for induction welding the workpiece secured between the first support structure and the second support structure.

The trunks may be arranged longitudinally along the frame.

A first of the trunks may be connected to the frame by a quick release coupler and a fastener assembly. The quick release coupler may be configured for temporarily maintaining a vertical position of the first of the trunks where the fastener assembly is loose. The fastener assembly may be configured to fix the vertical position of the first of the trunks during the induction welding of the workpiece.

The first support structure may have a first contact surface configured to contact a first side of the workpiece, and the first contact surface may be flat. In addition or alternatively, the second support structure may have a second contact surface configured to contact a second side of the workpiece, and the second contact surface may be flat.

The first support structure may have a first contact surface configured to contact a first side of the workpiece, and at least a portion of the first contact surface may be curved. In addition or alternatively, the second support structure may have a second contact surface configured to contact a second side of the workpiece, and at least a portion of the second contact surface may be curved.

The induction welding assembly may also include an induction welding coil configured to induction weld a first member of the workpiece to a second member of the workpiece while the workpiece is secured vertically between the first support structure and the second support structure.

The induction welding assembly may also include a gantry. The gantry may include the second support structure.

The fixture may also include a third support structure. The third support structure may include a second frame and a plurality of second trunks. Each of the second trunks may be connected to and repositionable on the second frame. The fixture may also be configured to secure the workpiece with the third support structure using the second trunks during the induction welding of the workpiece.

The fixture may be configured to secure the workpiece vertically between the first support structure and the third support structure using the second trunks during the induction welding of the workpiece.

The induction welding assembly may also include a second gantry. The second gantry may include the third support structure.

The gantry and/or the second gantry may be a mobile gantry.

The gantry and/or the second gantry may be a fixed gantry.

The heat management device may be configured as a heat sink.

The heat management device may be configured as an insulator.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
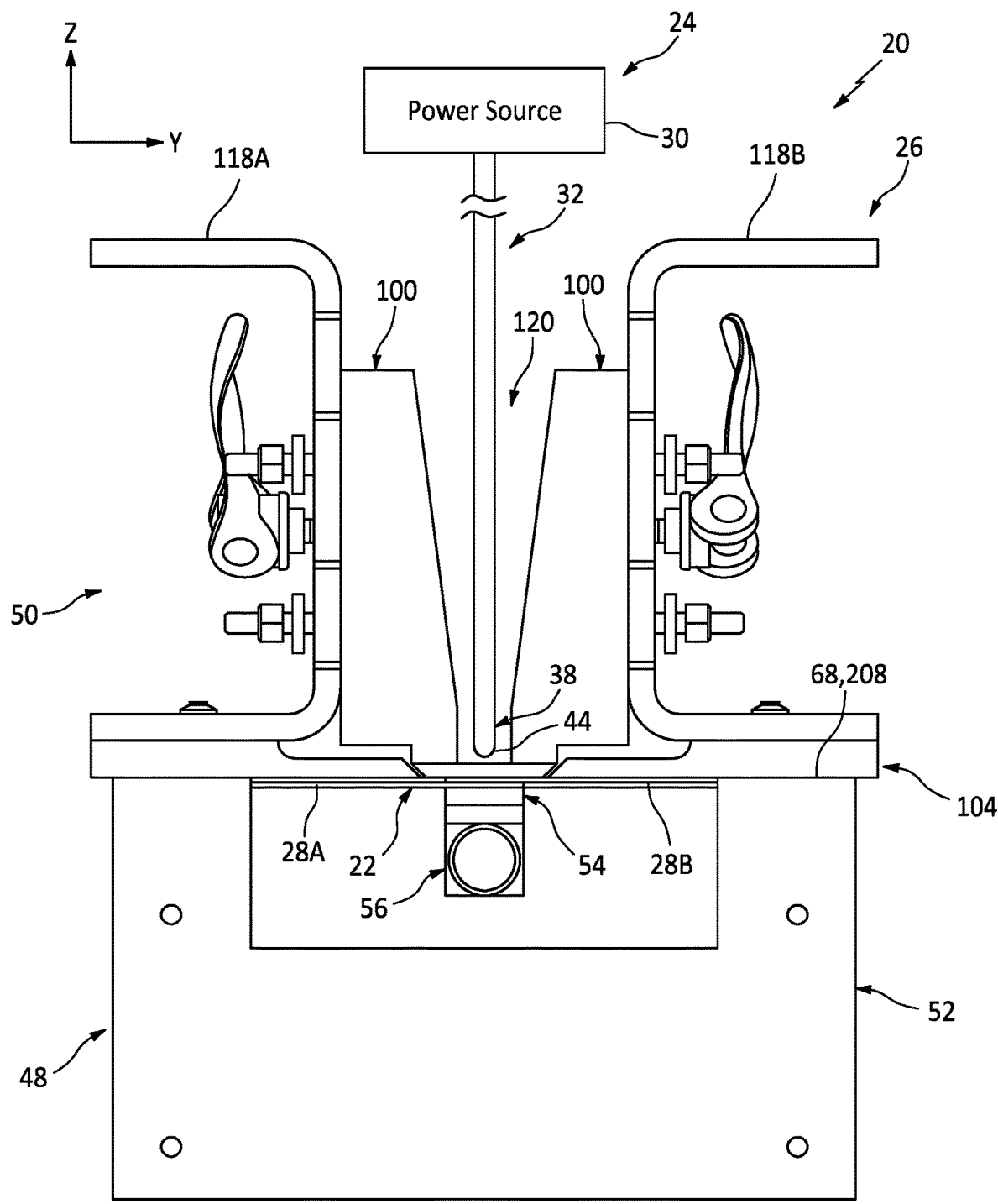
FIG. 1 is a side illustration of a portion of a system for induction welding a workpiece.

FIG. 1 illustrates a system 20 for induction welding a workpiece 22. This induction welding system 20 includes an induction welder 24 and an induction welding fixture 26.

The induction welder 24 is configured to induction weld the workpiece 22. More particularly, the induction welder 24 is configured to induction weld two or more members 28A and 28B (generally referred to as "28") of the workpiece 22 together, which workpiece members 28 may be (e.g., discretely formed) thermoplastic bodies or any other type of induction weldable bodies. The induction welder 24 of FIG. 1 includes a power source 30 and an induction coil assembly 32.

The power source 30 is configured to generate a periodic electrical current. The power source 30, for example, may be configured as a high-frequency current source. The power source 30 may be or otherwise include an alternating current (AC) generator, transformer, amplifier, etc. Alternatively, the power source 30 may include a direct current (DC) generator, transformer, amplifier, battery, etc. electrically coupled with an oscillator. The present disclosure, however, is not limited to such exemplary power sources.

Figure 2:
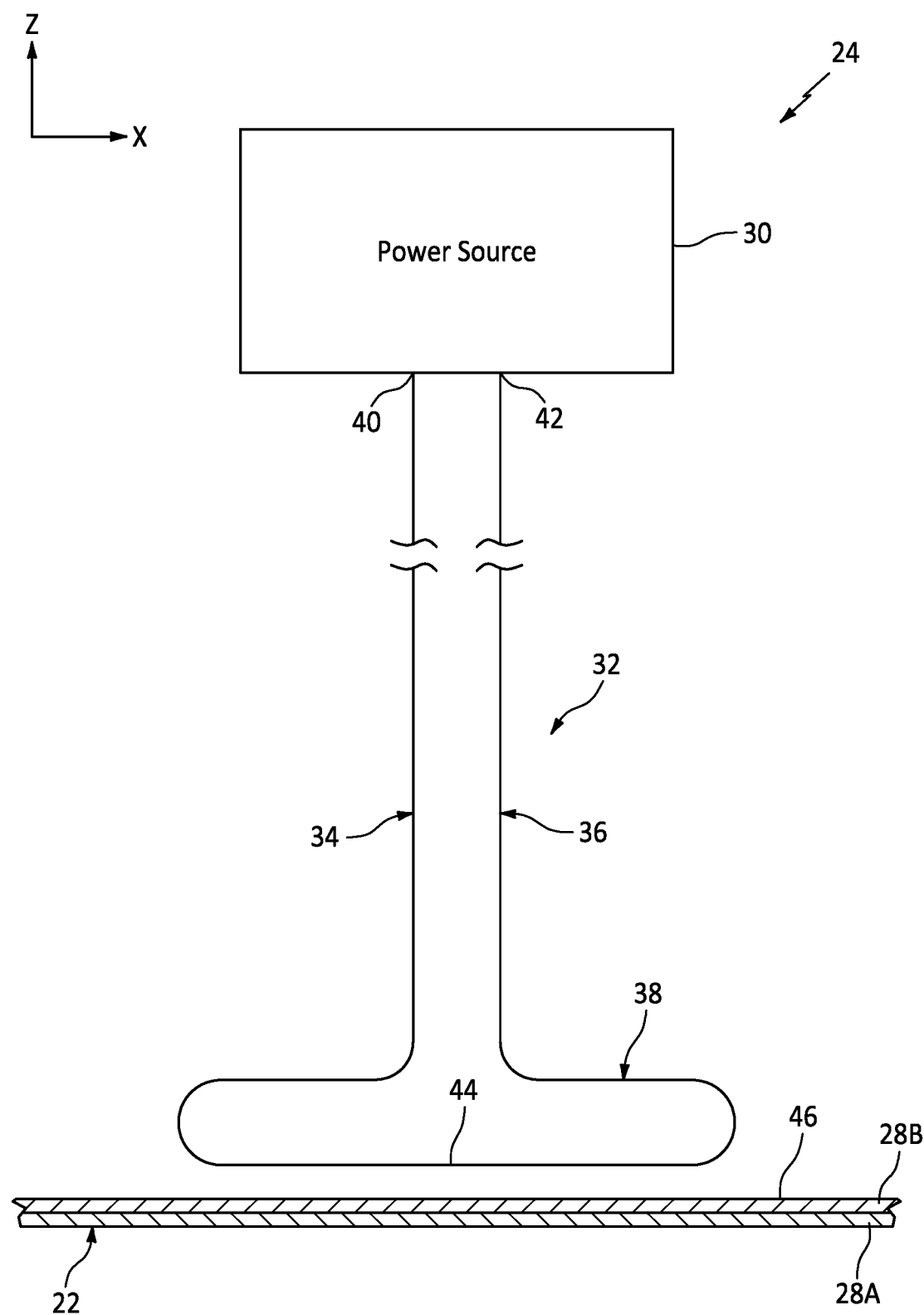
FIG. 2 is a schematic illustration of an induction welder arranged with the workpiece.

Referring to FIG. 2, the induction coil assembly 32 includes an electrical first lead 34, an electrical second lead 36 and an induction welding coil 38. The first lead 34 may be arranged parallel with the second lead 36. The first lead 34 and the second lead 36 are connected to opposing ends of the induction welding coil 38. The first lead 34 and the second lead 36 electrically couple the induction welding coil 38 to respective terminals 40 and 42 of the power source 30.

The induction welding coil 38 may be configured as an elongated loop. The induction welding coil 38 of FIG. 2, for example, extends along a non-straight (e.g., generally racetrack shaped) centerline between and to the coil ends. The induction welding coil 38 of FIG. 2 includes at least one welding (e.g., bottom side) segment 44. This welding segment 44 may be configured to substantially match an exterior surface contour of the workpiece 22 to be induction welded. The welding segment 44, for example, may be straight where the workpiece 22 has a flat exterior surface 46. The welding segment 44 may alternatively be non-straight (e.g., curved, compound, etc.) where the workpiece exterior surface 46 is a non-straight; e.g., curved, compound, etc. The present disclosure, however, is not limited to the foregoing exemplary induction welding coil configurations.

Referring to FIG. 1, the induction welding fixture 26 is configured to position and secure (e.g., temporarily, fixedly hold) the workpiece 22 during induction welding. More particularly, the induction welding fixture 26 is configured to position and secure the workpiece members 28 together while those members 28 are induction welded together using the induction welding coil 38.

The induction welding fixture 26 of FIG. 1 includes a first (e.g., bottom, base) support structure 48 and a second (e.g., top, lid) support structure 50. For ease of description, the first support structure 48 is referred to below as a "bottom support structure" and the second support structure 50 is referred to below as a "top support structure". However, the present disclosure is not limited to such an exemplary orientation relative to gravity. For example, in other embodiments, the support structure 50 may be arranged vertically below, or to a side of, the support structure 48.

Figure 3:
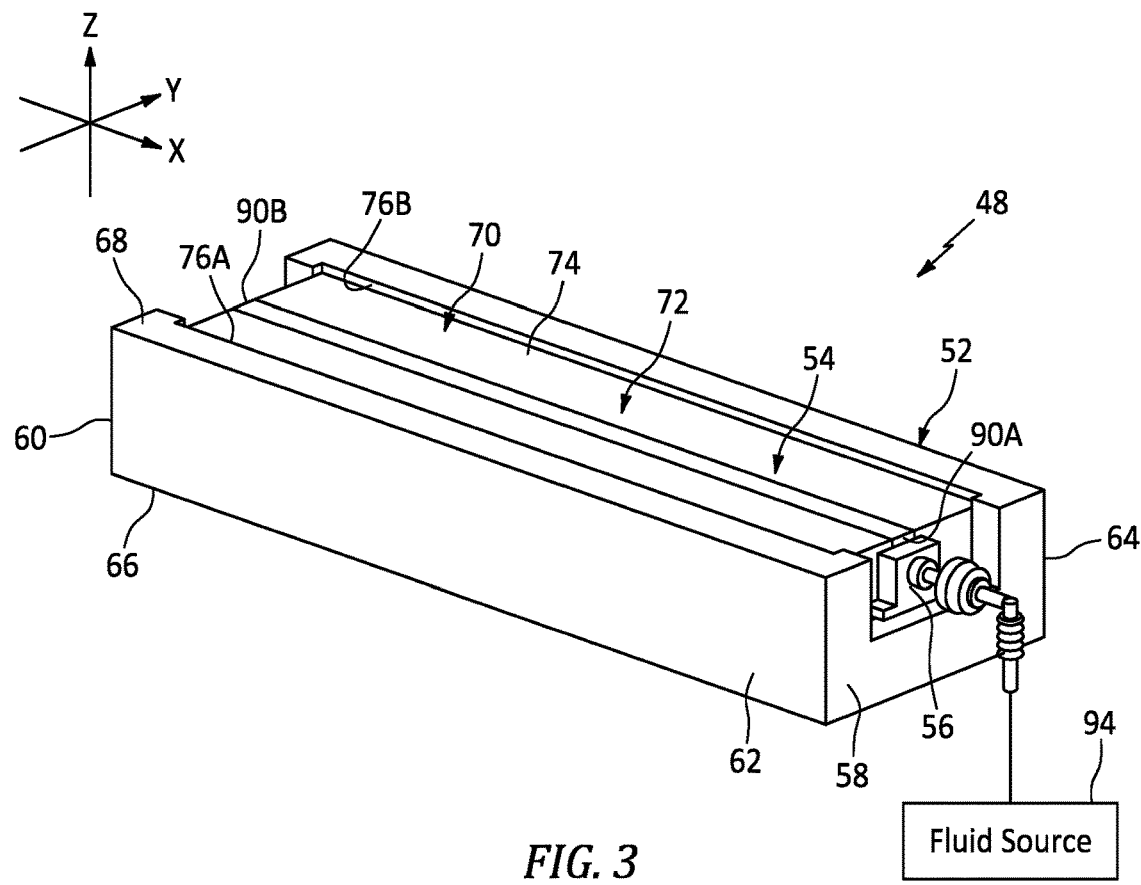
FIG. 3 is a perspective illustration of a bottom support structure.

Referring to FIG. 3, the bottom support structure 48 includes a support structure base 52, a bottom heat management device 54 (e.g., a heat sink or an insulator) and an actuator 56. The support structure base 52 extends longitudinally (e.g., along an x-axis) between and to a first end 58 of the support structure base 52 and a second end 60 of the support structure base 52. The support structure base 52 extends laterally (e.g., along a y-axis) between and to a first side 62 of the support structure base 52 and a second side 64 of the support structure base 52. The support structure base 52 extends vertically (e.g., along a z-axis) between and to a bottom side 66 of the support structure base 52 and a top side 68 of the support structure base 52.

Figure 4:
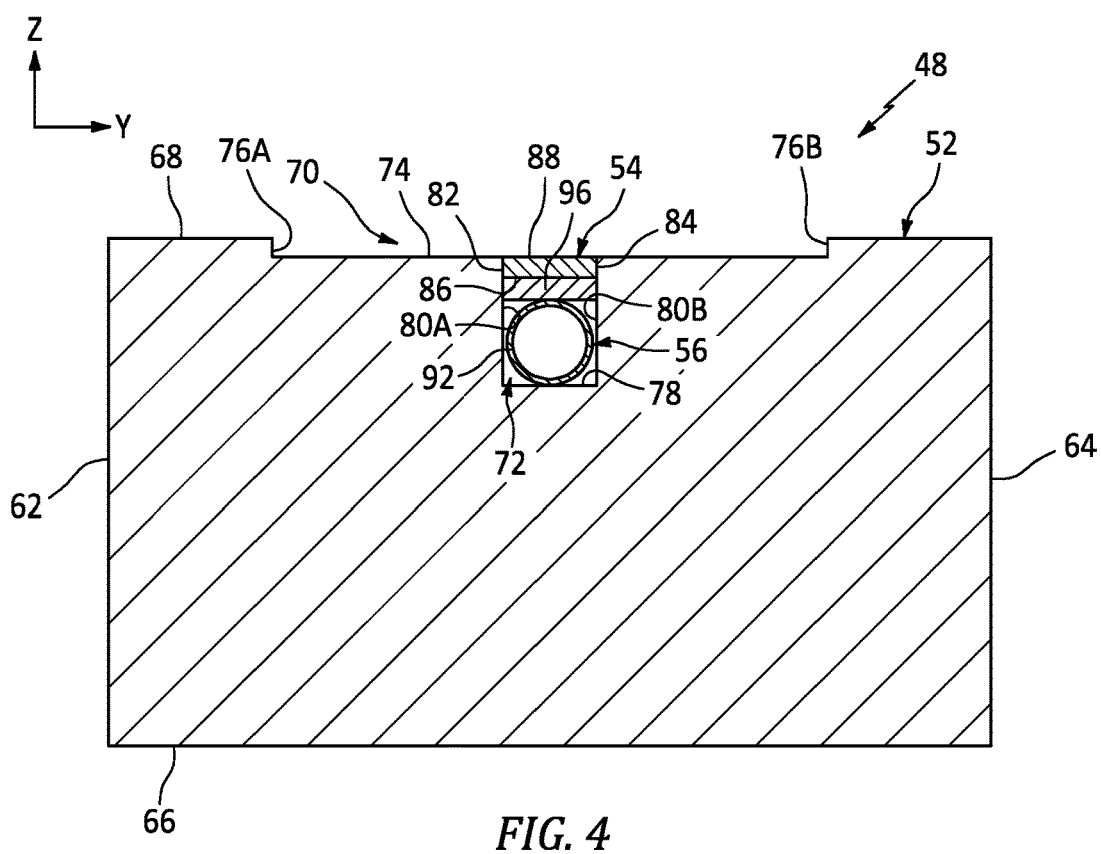
FIG. 4 is a cross-sectional illustration of the bottom support structure.

Referring to FIG. 4, the support structure base 52 is configured with a receptacle 70 adapted to receive the workpiece 22 (see FIG. 1). The support structure base 52 is also configured with a channel 72 configured to receive the bottom heat management device 54 and the actuator 56.

The workpiece receptacle 70 may be configured as a channel or a depression in the base top side 68. The workpiece receptacle 70 of FIG. 4, for example, is located at (e.g., on, adjacent or proximate) the base top side 68, and intermediate (e.g., midway) laterally between the opposing base sides 62 and 64. The workpiece receptacle 70 extends vertically into the support structure base 52 from the base top side 68 to a receptacle end surface 74 of the support structure base 52. The workpiece receptacle 70 extends laterally within the support structure base 52 between and to opposing receptacle side surfaces 76A and 76B (generally referred to as "76") of the support structure base 52. The workpiece receptacle 70 extends longitudinally through (or within) the support structure base 52 between and to or about the opposing base ends 58 and 60 (see FIG. 3).

The base channel 72 is also located at (e.g., on, adjacent or proximate) the base top side 68, and intermediate (e.g., midway) laterally between the opposing base sides 62 and 64 and the opposing receptacle side surfaces 76. The base channel 72 of FIG. 4, for example, extends vertically into the support structure base 52 from the receptacle end surface 74 to a channel end surface 78 of the support structure base 52. The base channel 72 extends laterally within the support structure base 52 between and to opposing channel sides surfaces 80A and 80B (generally referred to as "80") of the support structure base 52. The base channel 72 extends longitudinally through (or within) the support structure base 52 between and to or about the opposing base ends 58 and 60 (see FIG. 3). The support structure base 52 of the present disclosure, however, is not limited to such an exemplary channel configuration. For example, in other embodiments, the base channel 72 may extends vertically into the support structure base 52 from the base top side 68 where, for example, the workpiece receptacle 70 is omitted.

The support structure base 52 may be constructed from a non-electrically conductive material. This non-electrically conductive material may be a polymer such as, but not limited to, polyurethane. The present disclosure, however, is not limited to the foregoing exemplary support structure base materials.

The bottom heat management device 54 may be or otherwise include a heat sink configured to absorb heat energy. The bottom heat management device 54, for example, may be constructed from a ceramic such as, but not limited to, aluminum silicate (also referred to as alumina silicate). The present disclosure, however, is not limited to the foregoing exemplary first heat sink materials. Furthermore, in other embodiments, the bottom heat management device 54 may be or otherwise include an insulator. The heat management device 54, for example, may be configured to absorb and/or block transfer of heat energy.

The bottom heat management device 54 of FIG. 4 extends laterally between and to a first side 82 of the bottom heat management device 54 and a second side 84 of the bottom heat management device 54. The bottom heat management device 54 extends vertically between and to a bottom side 86 of the bottom heat management device 54 and a top side 88 of the bottom heat management device 54. Referring to FIG.

3, the bottom heat management device 54 extends longitudinally between and to opposing ends 90A and 90B (generally referred to as "90") of the bottom heat management device 54).

The bottom heat management device 54 of FIG. 4 is mated with (e.g., received within) the base channel 72. The heat management device first side 82 is abutted laterally against and moveable (e.g., slidable) along the channel first side surface 80A. The heat management device second side 84 is abutted laterally against and moveable (e.g., slidable) along the channel second side surface 80B. The heat management device bottom side 86 faces the channel end surface 78. The heat management device top side 88 faces away from the support structure base 52; e.g., in a vertical upwards direction.

The actuator 56 is mated with (e.g., received within) the base channel 72, and arranged vertically between the channel end surface 78 and the bottom heat management device 54. The actuator 56 is configured to push (e.g., bias) the bottom heat management device 54 vertically away from the support structure base 52 and its channel end surface 78. The actuator 56 of FIG. 4, for example, is configured as an expandable pressure vessel 92; e.g., fluid bladder such as, but not limited to, an expandable air tube, an expandable air bag, etc. This pressure vessel 92 is connected to a fluid source 94; e.g., a compressed air reservoir (e.g., a tank) and/or an air pump. The pressure vessel 92 is configured to receive fluid (e.g., compressed air) from the fluid source 94, where regulation of the fluid may cause the pressure vessel 92 to expand or contract in size. When the pressure vessel 92 expands in size, the fixed channel surfaces 78 and 80 may cause the pressure vessel 92 to expand in a vertically upward direction and thereby push the bottom heat management device 54 vertically within the base channel 72 away from the channel end surface 78. However, when the pressure vessel 92 contracts in size, the pressure vessel 92 may contract in a vertically downward direction and the bottom heat management device 54 may move vertically within the base channel 72 towards from the channel end surface 78.

In some embodiments, a spacer 96 may be disposed within the base channel 72 vertically between the pressure vessel 92 and the bottom heat management device 54. This spacer 96 may be configured to provide a thermal break/a thermal insulator between the bottom heat management device 54 and the pressure vessel 92. The spacer 96, for example, may be constructed from a thermally insulating material such as, but not limited to, silicon.

Figure 5:
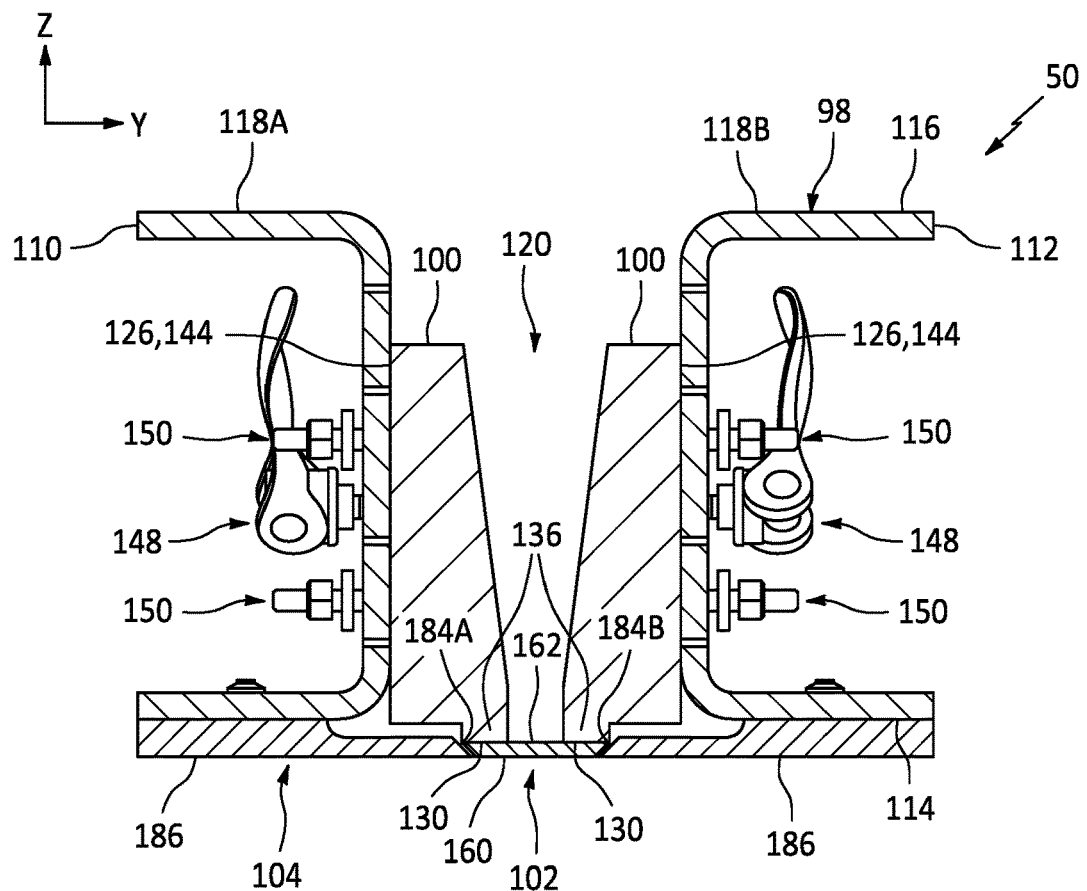
FIG. 5 is a cross-sectional illustration of a top support structure.

Referring to FIG. 5, the top support structure 50 includes a frame 98, a plurality of trunks 100 and a top heat sink 102. The top support structure 50 of FIG. 5 also includes a top heat sink holder 104.

Figure 6:
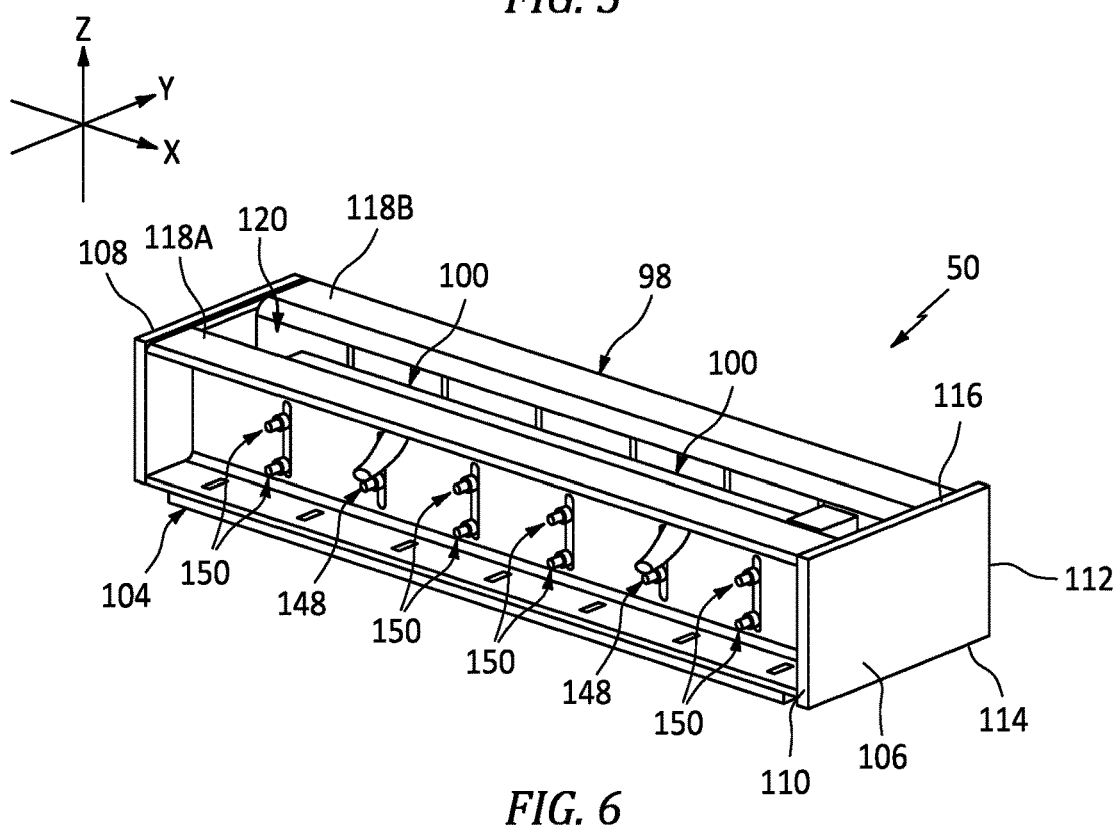
FIG. 6 is a perspective illustration of the top support structure.

Referring to FIG. 6, the support structure frame 98 extends longitudinally between and to a first end 106 of the support structure frame 98 and a second end 108 of the support structure frame 98. The support structure frame 98 extends laterally between and to a first side 110 of the support structure frame 98 and a second side 112 of the support structure frame 98. The support structure frame 98 extends vertically between and to a bottom side 114 of the support structure frame 98 and a top side 116 of the support structure frame 98.

The support structure frame 98 of FIG. 6 includes one or more frame beams 118A and 118B (generally referred to as "118"). These frame beams 118 are arranged parallel with one another. Each of the frame beams 118 extends longitudinally between and to (or about) the opposing frame ends 106 and 108. Each of the frame beams 118 extends vertically between and to the opposing frame sides 114 and 116. The first beam 118A is arranged at (e.g., on, adjacent or proximate) the frame first side 110. The second beam 118B is arranged at (e.g., on, adjacent or proximate) the frame second side 112. The first beam 118A and the second beam 118B are laterally displaced from one another by an inter-beam channel 120.

Referring to FIG. 5, each of the frame beams 118 may have a channeled (e.g., C-channel) cross-sectional geometry when viewed, for example, in a plane perpendicular to the longitudinal x-axis; e.g., plane of FIG. 5. The support structure frame 98 of the present disclosure, however, is not limited to such an exemplary frame beam configuration.

The support structure frame 98 and each of its beams 118 may be constructed from metal such as, but not limited to, steel. The present disclosure, however, is not limited to such exemplary support structure frame materials.

Figure 7:
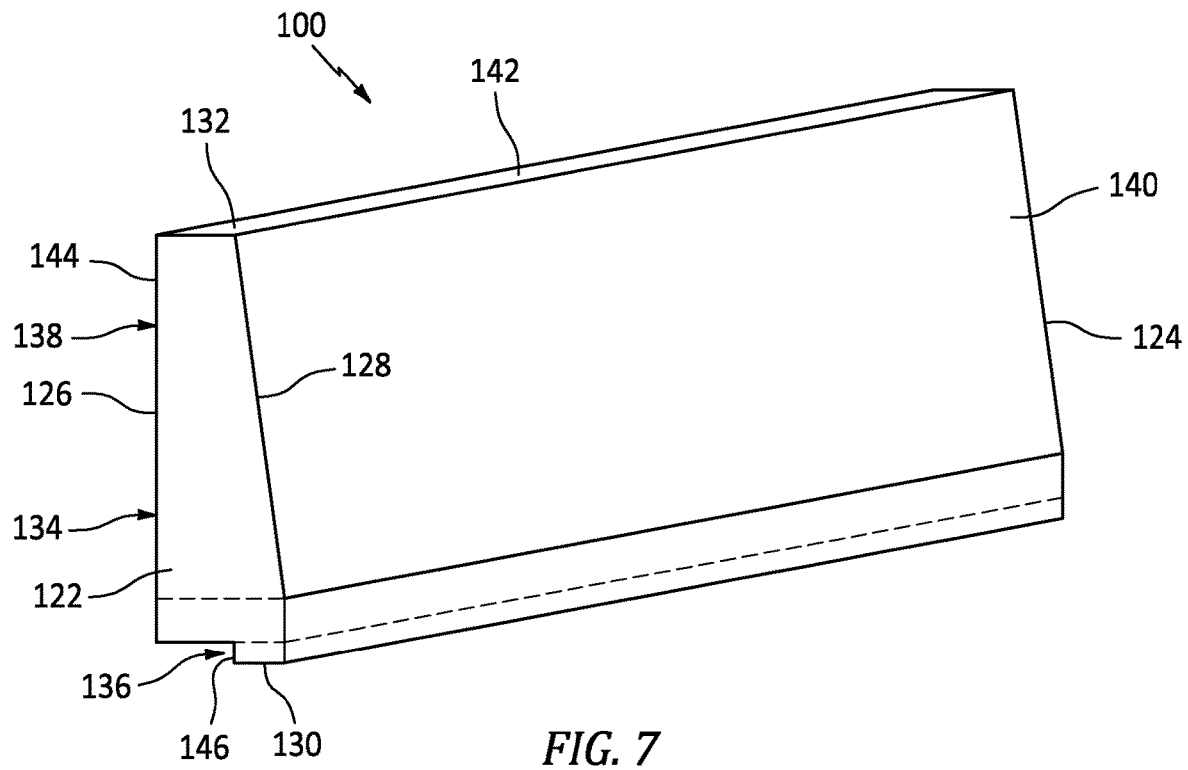
FIG. 7 is a perspective illustration of a trunk.

Referring to FIG. 7, each trunk 100 may be configured as a support block. Each trunk 100, for example, extends longitudinally between and to a first end 122 of the respective trunk 100 and a second end 124 of the respective trunk 100. Each trunk 100 extends laterally between a first side 126 of the respective trunk 100 and a second side 128 of the respective trunk 100. Each trunk 100 extends vertically between a bottom side 130 of the respective trunk 100 and a top side 132 of the respective trunk 100.

Each trunk of FIG. 7 includes a trunk base 134 and a trunk protrusion 136; e.g., a clamp head. Each of these trunk elements 134 and 136 may extend longitudinally between and to the opposing trunk ends 122 and 124.

The trunk base 134 is arranged at (e.g., on, adjacent or proximate) the trunk top side 132. The trunk base 134 of FIG. 7, for example, extends vertically from the trunk top side 132 towards the trunk bottom side 130. This trunk base 134 extends laterally between and to the opposing trunk sides 126 and 128. At least a portion 138 (or an entirety) of the trunk base 134 may be laterally tapered. The trunk portion 138 of FIG. 7, for example, laterally tapers as the trunk base 134 extends vertically to the trunk top side 132. This tapered configuration provides the trunk base 134 with a canted exterior surface 140 extending along the trunk second side 128. This second side surface 140 is angularly offset from an exterior surface 142 of the trunk 100 extending along the trunk top side 132 by an included angle; e.g., an obtuse angle. The second side surface 140 is angularly offset from an exterior surface 144 of the trunk 100 extending along the trunk first side 126 by an included angle; e.g., an acute angle. The first side surface 144, by contrast, may be configured perpendicular to the top side surface 142.

The trunk protrusion 136 is arranged at (e.g., on, adjacent or proximate) the trunk bottom side 130. The trunk protrusion 136 of FIG. 7, for example, projects vertically out from the trunk base 134 to the trunk bottom side 130. The trunk protrusion 136 is arranged at (e.g., on, adjacent or proximate) the trunk second side 128. The trunk protrusion 136 of FIG. 7, for example, projects laterally from the trunk second side 128 to a side 146 of the trunk protrusion 136 which is laterally displaced from the trunk first side 126.

Each trunk 100 may be constructed from a non-electrically conductive material. This non-electrically conductive material may be a polymer such as, but not limited to, polyurethane. The present disclosure, however, is not limited to the foregoing exemplary trunk materials.

Figure 8:
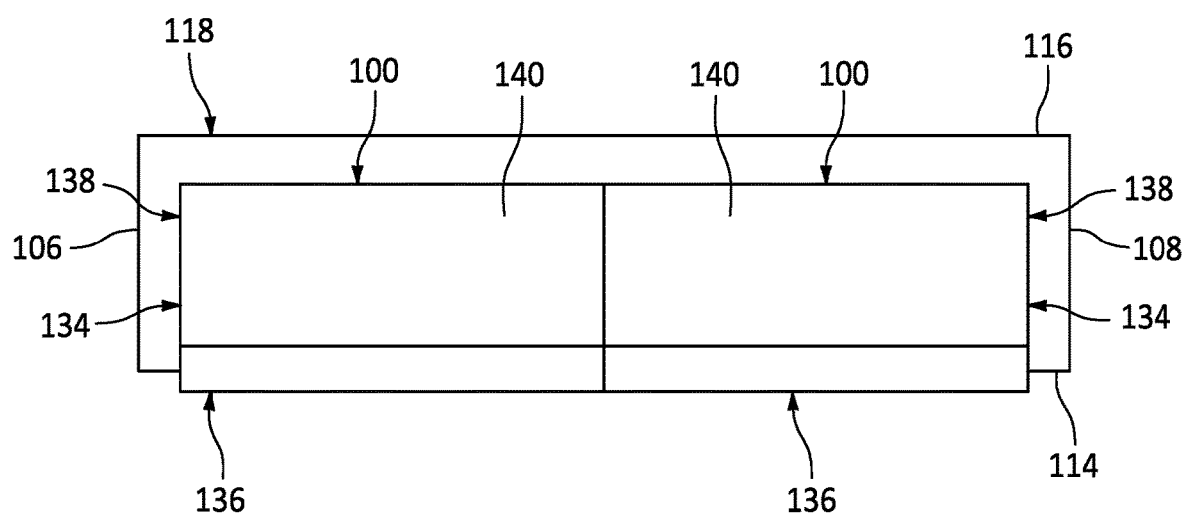
FIG. 8 is a side view illustration of a set of the trunks arranged with a beam of the top support structure.

Referring to FIG. 5, the trunks 100 are arranged within the inter-beam channel 120. Referring to FIG. 8, each of the frame beams 118 is configured with a set (e.g., a row) of one or more of the trunks 100. Each set of the trunks 100, for example, may be arranged end-to-end longitudinally along a respective one of the frame beams 118, where the trunk first sides 126 laterally engage (e.g., contact, abut) the respective frame beam 118; see FIG. 5.

Referring to FIGS. 5 and 6, each of the trunks 100 is connected to the respective frame beam 118 in a repositionable manner. For example, each trunk 100 of FIGS. 5 and 6 is secured to the respective frame beam 118 by a quick release coupler 148 and one or more fastener assemblies 150; e.g., bolt and nut assemblies. Each of these connectors 148 and 150 may be mated with a respective aperture (e.g., slot) in a web of the frame beam 118, which aperture is sized to facilitate vertical (e.g., up and down) movement of the trunk 100 along the respective frame beam 118 and its web. The quick release coupler 148 is configured to temporarily maintain a vertical position of the respective trunk 100 along the respective frame beam 118 while the fastener assemblies 150 are loose. The fastener assemblies 150 are configured to fix the vertical position of the respective trunk 100 for the induction welding of the workpiece 22 (see FIG. 1). Each of the fastener assemblies 150, for example, may be tightened to clamp the respective trunk 100 laterally against the respective frame beam 118 and its web and thereby fix the vertical position of the trunk 100.

Figure 9:
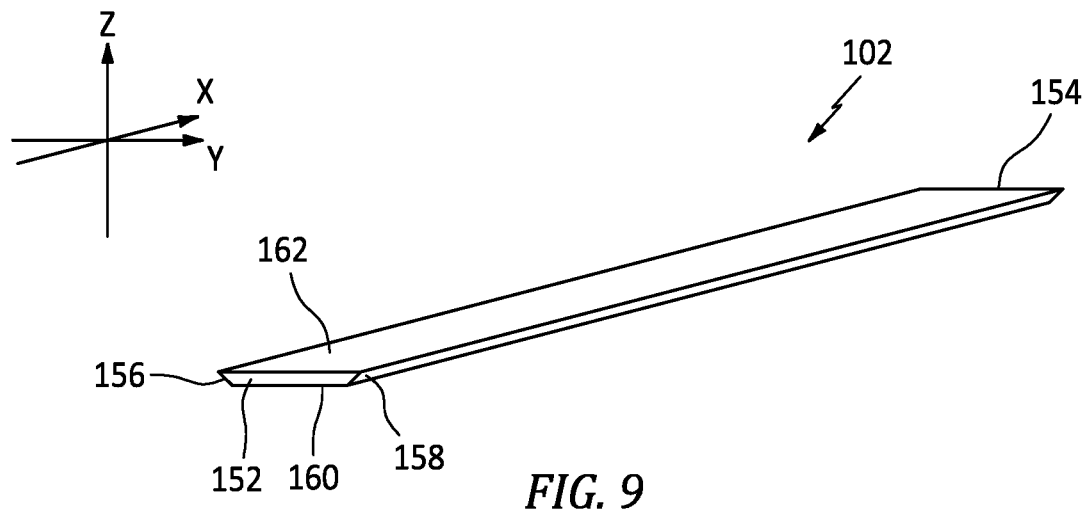
FIG. 9 is a perspective illustration of a heat sink.

Referring to FIG. 9, the top heat sink 102 is configured as a component operable to absorb heat energy. The top heat sink 102, for example, may be constructed from a ceramic such as, but not limited to, aluminum silicate (also referred to as alumina silicate). The present disclosure, however, is not limited to the foregoing exemplary top heat sink materials.

The top heat sink 102 of FIG. 9 extends longitudinally between and to a first end 152 of the top heat sink 102 and a second end 154 of the top heat sink 102. The top heat sink 102 extends laterally between and to a first side 156 of the top heat sink 102 and a second side 158 of the top heat sink 102. The top heat sink 102 extends vertically between and to a bottom side 160 of the top heat sink 102 and a top side 162 of the top heat sink 102.

The top heat sink 102 may be laterally tapered. The top heat sink 102 of FIG. 9, for example, laterally tapers as the top heat sink 102 extends vertically from the heat sink top side 162 to the heat sink bottom side 160. The top heat sink 102 of FIG. 9, for example, has a (e.g., isosceles) trapezoidal cross-sectional geometry when viewed, for example, in a plane perpendicular to the longitudinal x-axis. The present disclosure, however, is not limited to such an exemplary second heat sink configuration.

Figure 10:
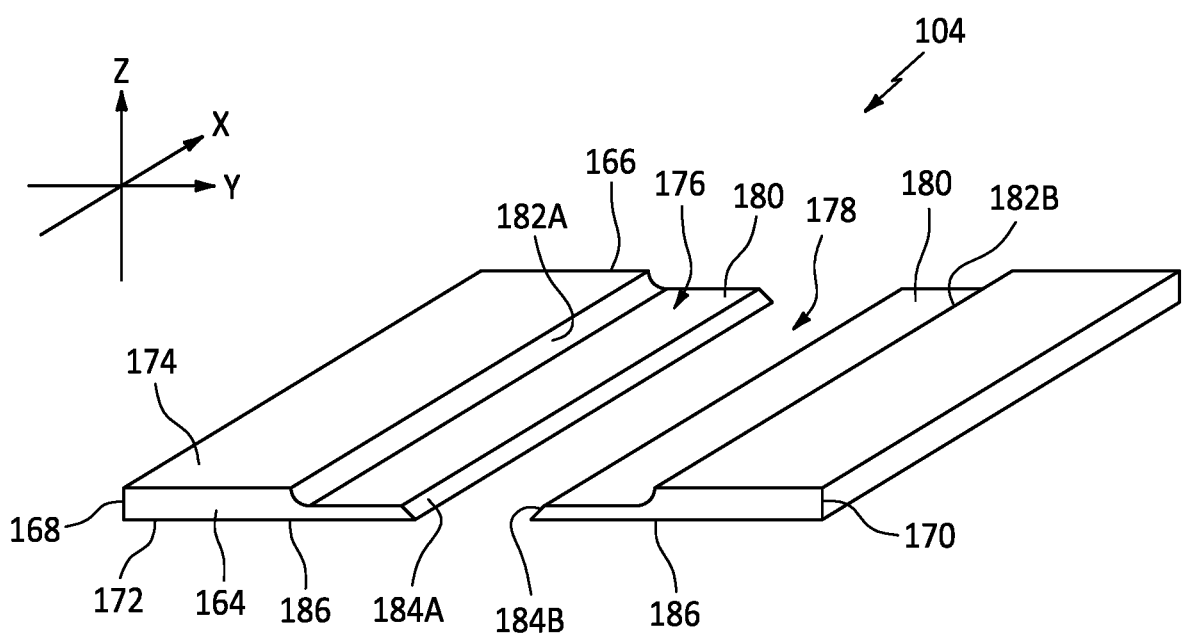
FIG. 10 is a perspective illustration of a heat sink holder.

Referring to FIG. 10, the heat sink holder 104 extends longitudinally between and to a first end 164 of the heat sink holder 104 and a second end 166 of the heat sink holder 104. The heat sink holder 104 extends laterally between and to a first side 168 of the heat sink holder 104 and a second side 170 of the heat sink holder 104. The heat sink holder 104 extends vertically between and to a bottom side 172 of the heat sink holder 104 and a top side 174 of the heat sink holder 104.

The heat sink holder 104 of FIG. 10 is configured with a trunk recess 176 and a heat sink receptacle 178. Each of these holder apertures 176 and 178 may extend longitudinally through (or within) the heat sink holder 104 between the opposing ends 164 and 166.

The trunk recess 176 is arranged at (e.g., on, adjacent or proximate) the holder top side 174, and intermediate (e.g., midway) laterally between the opposing holder sides 168 and 170. The trunk recess 176 of FIG. 10, for example, extends vertically into the heat sink holder 104 from the holder top side 174 to a recess end surface 180 of the heat sink holder 104. The trunk recess 176 extends laterally within the heat sink holder 104 between and to opposing recess side surfaces 182A and 182B (generally referred to as "182") of the heat sink holder 104. In some embodiments, the opposing recess side surfaces 182 may have an arcuate cross-sectional geometry when viewed, for example, in a plane perpendicular to the longitudinal x-axis.

The heat sink receptacle 178 is located at (e.g., on, adjacent or proximate) the holder bottom side 172, and intermediate (e.g., midway) laterally between the opposing holder sides 168 and 170 and the opposing recess side surfaces 182. The heat sink receptacle 178 of FIG. 10, for example, extends vertically into the heat sink holder 104 from the recess end surface 180 to the holder bottom side 172. The heat sink receptacle 178 extends laterally within the heat sink holder 104 between and to opposing receptacle side surfaces 184A and 184B (generally referred to as "184") of the heat sink holder 104. Each of these receptacle side surfaces 184 may be a canted surface. Each of the receptacle side surfaces 184, for example, may be angularly offset from a surface 186 extending along the holder bottom side 172 by an included angle; e.g., an acute angle. The heat sink receptacle 178 may thereby have, for example, a (e.g., isosceles) trapezoidal cross-sectional geometry when viewed, for example, in a plane perpendicular to the longitudinal x-axis. This trapezoidal cross-sectional geometry may be similar to the trapezoidal cross-sectional geometry of the top heat sink 102 of FIG. 9 in shape, but may be slightly larger in size as shown in FIG. 5.

The heat sink holder 104 may be constructed from a non-electrically conductive material. This non-electrically conductive material may be a polymer such as, but not limited to, polyurethane. The present disclosure, however, is not limited to the foregoing exemplary heat sink holder materials.

Referring to FIG. 5, the heat sink holder 104 is connected to the support structure frame 98 at the frame bottom side 114. The heat sink holder 104, for example, is connected (e.g., mechanically fastened, bonded and/or otherwise attached) to flanges of the frame beams 118 at the frame bottom side 114.

The top heat sink 102 is mated with (e.g., received within) the heat sink receptacle 178 (see FIG. 10). The receptacle side surfaces 184 laterally overlap end portions of the top heat sink 102. The receptacle side surfaces 184 may thereby locate and vertically support the top heat sink 102 in its mated position. The trunks 100 may also be vertically positioned such that their projections 136 vertically engage (e.g., contact) and/or abut against the heat sink top side 162. The trunks 100 may thereby retain the top heat sink 102 within the heat sink receptacle 178 (see FIG. 10). The trunks 100 also provide a support (e.g., a backstop) for the top heat sink 102 during induction welding as described below in further detail.

Figure 11:
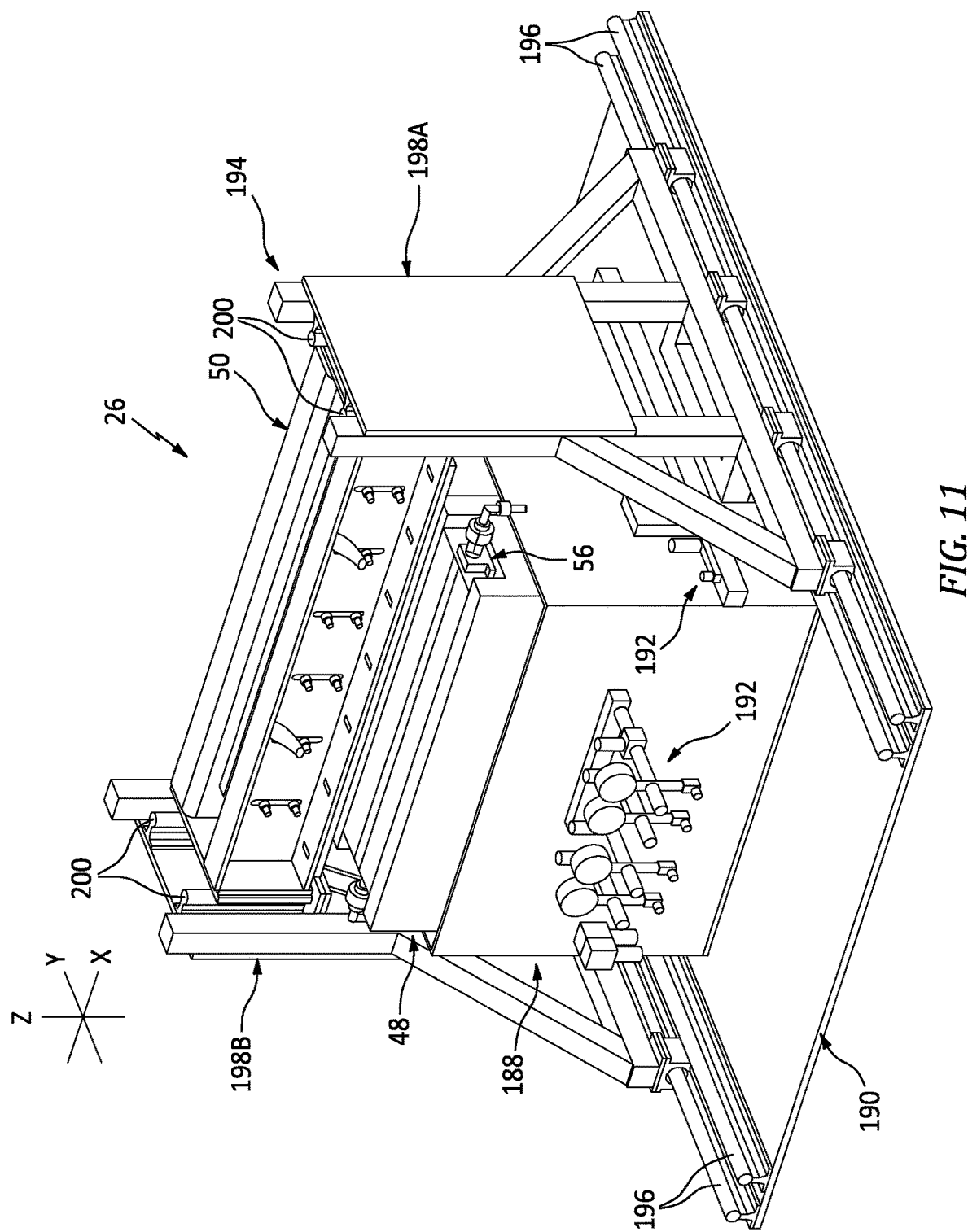
FIG. 11 is a perspective illustration of an induction welding fixture configured with the bottom support structure and the top support structure.

Referring to FIG. 11, the bottom support structure 48 may be mounted on a (e.g., fixed, stationary) base structure 188; e.g., a mounting block. The base structure 188 of FIG. 11 is configured to vertically elevate the bottom support structure 48 off of a floor 190; e.g., a metal plate or pan. The base structure 188 is also configured to provide mounting areas for fixture accessories 192 such as, but not limited to, valving and/or gauges for controlling and/or monitoring the actuator 56. Note, connections (e.g., conduits) between the elements 56 and 192 are omitted for clarity of illustration.

The top support structure 50 may be configured as part of a gantry 194. The gantry 194 of FIG. 11 is configured to move laterally (e.g., along the y-axis) along one or more tracks 196 (e.g., rails), which tracks 196 are disposed on opposing lateral sides of the base structure 188 and connected to the floor 190. The gantry 194 of FIG. 11 includes one or more vertical supports 198A and 198B (generally referred to as "198"); e.g., side frames. The top support structure 50 is vertically displaced from (e.g., positioned vertically above) the bottom support structure 48. The top support structure 50 is arranged longitudinally between and connected to the vertical supports 198. The top support structure 50 of FIG. 11 is configured to move vertically (e.g., along the z-axis) along one or more tracks 200 (e.g., rails), which tracks 200 are respectively connected to and extend vertically along the vertical supports 198. One or more actuators (e.g., hydraulic cylinders) may be configured to move the top support structure 50 along the tracks 200. One or more actuators (e.g., hydraulic cylinders) may also or alternatively be configured to move the gantry 194 along the tracks 196. Of course, in other embodiments, the top support structure 50 and/or the gantry 194 may be manually moveable.

Figure 12:
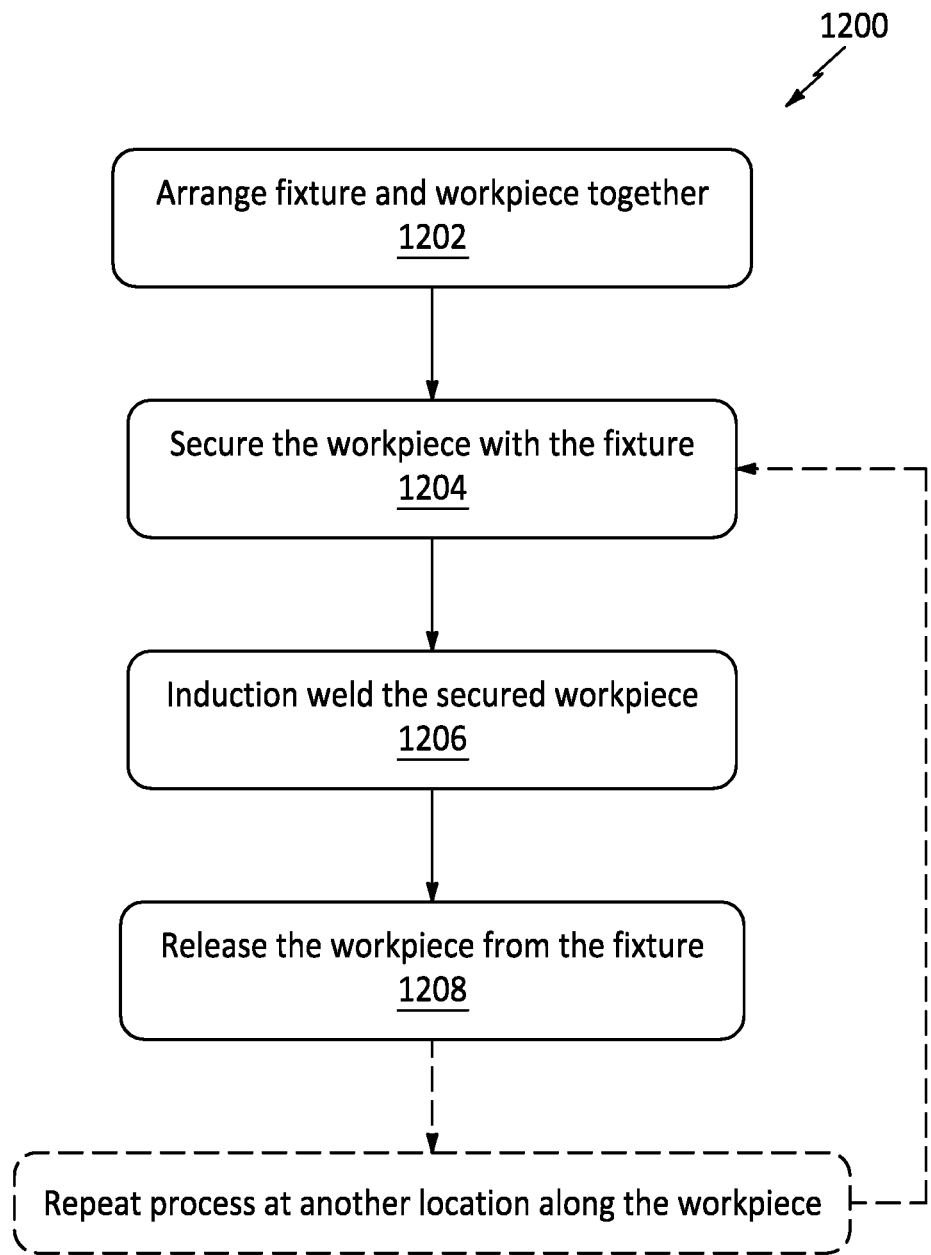
FIG. 12 is a flow diagram of a method for induction welding the workpiece.

FIG. 12 is a flow diagram of a method 1200 for induction welding a workpiece; e.g., the workpiece 22. This method 1200 may be performed using an induction welding system such as, but not limited to, the induction welding system 20 of FIG. 1.

Figure 13:
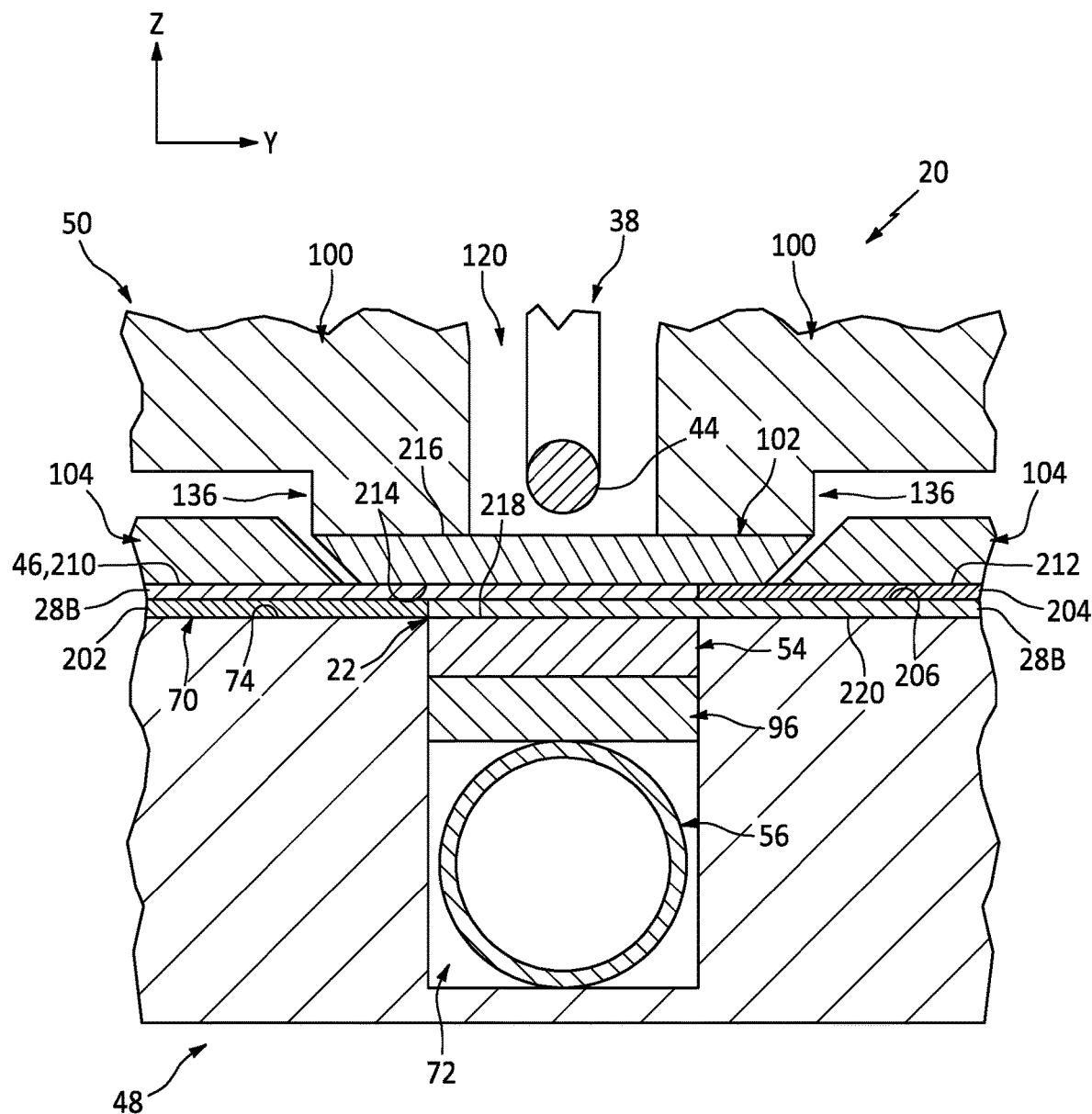
FIG. 13 is a cross-sectional illustration of a portion of the induction welding system.

In step 1202, the induction welding fixture 26 and the workpiece 22 are arranged together. The workpiece 22 and its members 28, for example, may be arranged vertically between the bottom support structure 48 and the top support structure 50. For example, referring to FIG. 13, the workpiece 22 may be arranged within the workpiece receptacle 70. A portion of the first workpiece member 28A may laterally and longitudinally overlap (e.g., lap) a portion of the second workpiece member 28B. One or more workpiece shims 202 and 204 may be provided to support the workpiece members 28, which workpiece shims 202 and 204 may be constructed from a composite material such as fiberglass embedded within an epoxy matrix. Each of these shims 202 and 204 may be arranged within the workpiece receptacle 70 with the workpiece 22. The bottom shim 202 of FIG. 13, for example, is located laterally adjacent (e.g., abutted against) a lateral edge of the first workpiece member 28A. This bottom shim 202 is located vertically between and engages (e.g., contacts) the receptacle end surface 74 and the second workpiece member 28B. The top shim 204 of FIG. 13 is located laterally adjacent (e.g., abutted against) a lateral edge of the second workpiece member 28B. This top shim 204 is located vertically on a (e.g., top) surface 206 of the first workpiece member 28A.

In step 1204, the workpiece 22 is secured vertically between the bottom support structure 48 and the top support structure 50. The top support structure 50 of FIG. 11, for example, may be moved along the tracks 200 until the top support structure 50 engages (e.g., contacts) one or more of the elements 22, 28B, 204; e.g., see FIGS. 1 and 13. The heat sink holder 104 of FIG. 1, for example, may vertically contact a top surface 208 of the support structure base 52 at its top end 68. Referring to FIG. 13, the heat sink holder 104 may vertically contact a top surface 210 of the second workpiece member 28B and a top surface 212 of the top shim 204. A bottom workpiece contact surface 214 of the top heat sink 102 may abut vertically against and contact the second workpiece member surface 210 and/or the second shim surface 212. The top heat sink 102 may thereby engage a top side of the workpiece 22 and its top surface 46.

The trunks 100 may be adjusted vertically such that the trunk protrusions 136 engage (e.g., contact) a top surface 216 of the top heat sink 102, which surface 216 is vertically opposite the heat sink surface 214. The trunks 100 may thereby provide a backstop for the top heat sink 102 as well as retain the top heat sink 102 against the workpiece 22 and its members 28.

The actuator 56 may be actuated (e.g., inflated) to move (e.g., push) the elements 54 and 96 vertically upwards within the base channel 72 towards the workpiece 22. This movement may cause the bottom heat management device 54 to vertically engage (e.g., contact) at least the workpiece 22 at a bottom side thereof. More particularly, a top workpiece contact surface 218 of the bottom heat management device 54 may abut vertically against and contact a bottom surface 220 of the first workpiece member 28A. The actuator 56 may be actuated further such that the workpiece 22 and its overlapping members 28 are pressed (e.g., clamped) vertically between the support structures 48 and 50 and their heat sinks 54 and 102. The workpiece 22 and its members 28 may thereby be secured (e.g., clamped) vertically between the support structures 48 and 50 and, more particularly, the heat sinks 54 and 102 using the trunks 100 as a backstop/anchor for the top heat sink 102.

Figure 14:
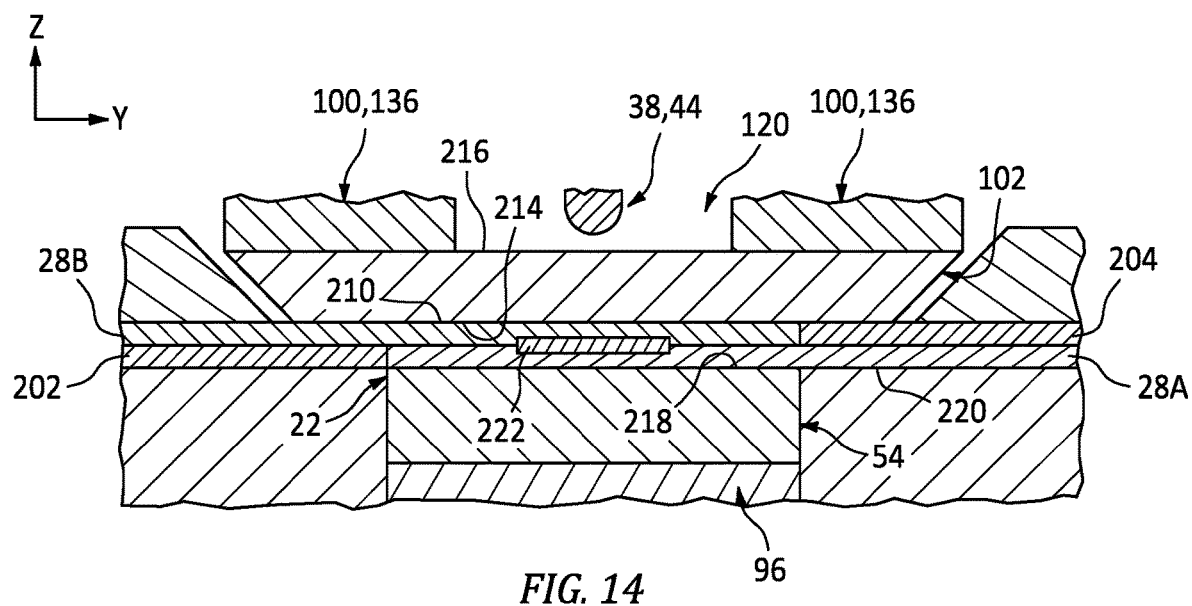
FIG. 14 is a cross-sectional illustration of a portion of the induction welding system during induction welding of a plurality of workpiece members together.

In step 1206, the workpiece 22 is induction welded. The induction welding coil 38, for example, may be arranged in the channel 120 between the trunks 100 such that the welding segment 44 is parallel with and slightly elevated from the heat sink surface 216. Once in position, the power source 30 (see FIG. 1) may provide a high frequency (e.g., alternating) current to the induction welding coil 38. The induction welding coil 38 may subsequently generate electromagnetic waves which excite one or more reinforcement fibers within the first workpiece member 28A via eddy currents and/or one or more of reinforcement fibers within the second workpiece member 28B via eddy currents. This excitation may elevate a temperature of the first workpiece member 28A and/or the second workpiece member 28B to a melting point temperature where a polymer (e.g., thermoplastic) matrix of the first workpiece member 28A and/or a polymer (e.g., thermoplastic) matrix of the second workpiece member 28B melts. Referring to FIG. 14, a melt layer may form at an interface 222 (e.g., a weld joint/seam) between the first workpiece member 28A and the second workpiece member 28B. This melt layer may bond the first workpiece member 28A and the second workpiece member 28B together upon cooling thereof.

The induction welding coil 38 may be moved longitudinally (e.g., in the y-axis direction) to provide an elongated welded seam between the first workpiece member 28A and the second workpiece member 28B. As the induction welding coil 38 moves longitudinally, the induction welding coil 38 translates laterally within the channel 120 along the trunks 100 on either side thereof.

By securing the workpiece 22 between the support structures 48 and 50 and their heat sinks 54 and 102 during the induction welding, the induction welding fixture 26 may maintain contact between the workpiece members 28 being welded together. The induction welding fixture 26 may also maintain a compressive force across the overlap joint between the workpiece members 28 to facilitate improved fusion. The heat sinks 54 and 102 may also or alternatively provide uniform heat for welding at the interface 222.

In step 1208, the workpiece 22 is released from the induction welding fixture 26. The actuator 56 of FIG. 13, for example, may be actuated (e.g., deflated) such that the bottom heat management device 54 moves (e.g., inwards)

away from the workpiece 22. The top support structure 50 may then be moved vertically (e.g., upwards) away from the workpiece 22. The now fused workpiece 22 may subsequently be removed from the induction welding fixture 26. Alternatively, the induction welding fixture 26 and the workpiece 22 may be rearranged to induction weld the workpiece 22 at another location; e.g., another location laterally along the workpiece 22. The steps 1204, 1206 and 1208 may be repeated at this other location to further induction weld the workpiece 22. For example, the first and the second workpiece members 28 may be welded together again at the other location to provide another weld seam. Alternatively, one or more other members 28 of the workpiece 22 may alternatively be induction welded together.

Figure 15A:
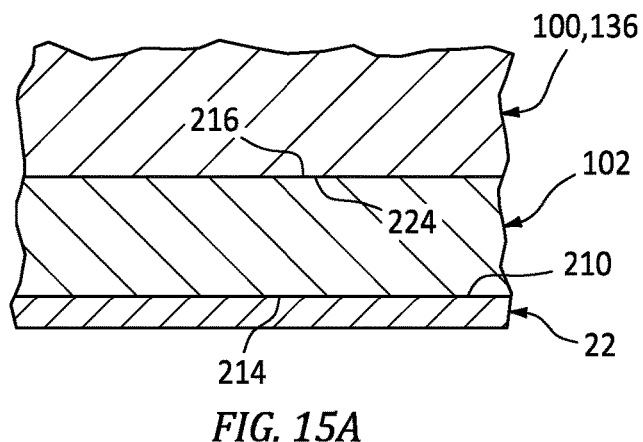
FIG. 15A is a sectional illustration of a portion of the top support structure engaging a workpiece with a planar configuration.
Figure 15B:
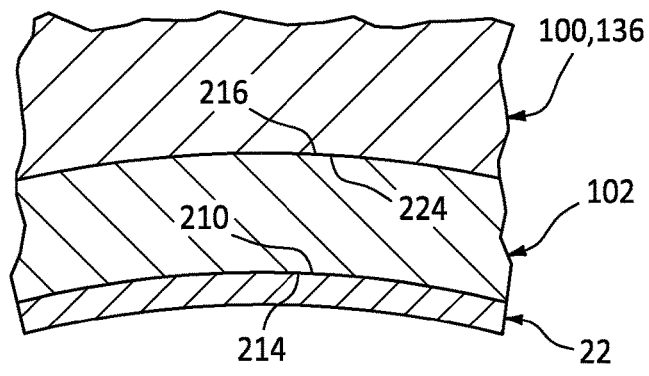
FIG. 15B is a sectional illustration of a portion of the top support structure engaging a workpiece with a non-planar configuration.

To accommodate induction welding of the workpiece 22 at multiple locations and/or induction welding workpieces 22 with various different configurations, the induction welding fixture 26 of the present disclosure is configured with multiple adjustable components. For example, the top support structure 50 may be moved laterally (e.g., via the gantry 194) and/or vertically to facilitate placement of the workpiece 22 with the induction welding fixture 26. The top support structure 50 may also or alternatively be moved to accommodate different workpiece thicknesses. The trunks 100 may be adjusted vertically for adjusting the backstop position of the top heat sink 102. The trunks 100 may also be adjusted vertically for removal and replacement of the top heat sink 102. One or more of the trunks 100 may also be swapped out (e.g., exchanged) for replacement trunks 100. By replacing the top heat sink 102 and/or the trunks 100, the induction welding fixture 26 may accommodate workpieces with different surface geometries (e.g., planar, curved or otherwise) along the overlap joint or the same workpiece with different surface geometries at different weld locations. For example, referring to FIG. 15A, where the exterior surface 210 of the workpiece 22 is planar (e.g., flat), a bottom (e.g., heat sink engagement) surface 224 of each trunk protrusion 136 and/or the heat sink surface 214, 216 may also be planar. Referring to FIG. 15B, where the exterior surface 210 of the workpiece 22 is curved, one or more of the trunk protrusions surfaces 224 and/or the heat sink surface 214, 216 may also be curved. Similarly, the bottom heat management device 54 and/or the workpiece shims 202 and 204 may be replaced depending upon the specific geometry of the workpiece 22 to be induction welded. In addition or alternatively, the support structure base 52 may also or alternatively be replaced in order to accommodate induction welding of workpieces with different configurations.

The method is described above as the induction welding fixture 26 being stationary and the workpiece 22 being moveable to adjust the position of the workpiece 22 relative to the induction welding fixture 26. However, in other embodiments, the workpiece 22 may be stationary and the induction welding fixture 26 may be moveable to adjust the position of the induction welding fixture 26 relative to the workpiece 22. In still other embodiments, both the induction welding fixture 26 and the workpiece 22 may be moveable for increasing adjustment options.

Figure 16A:
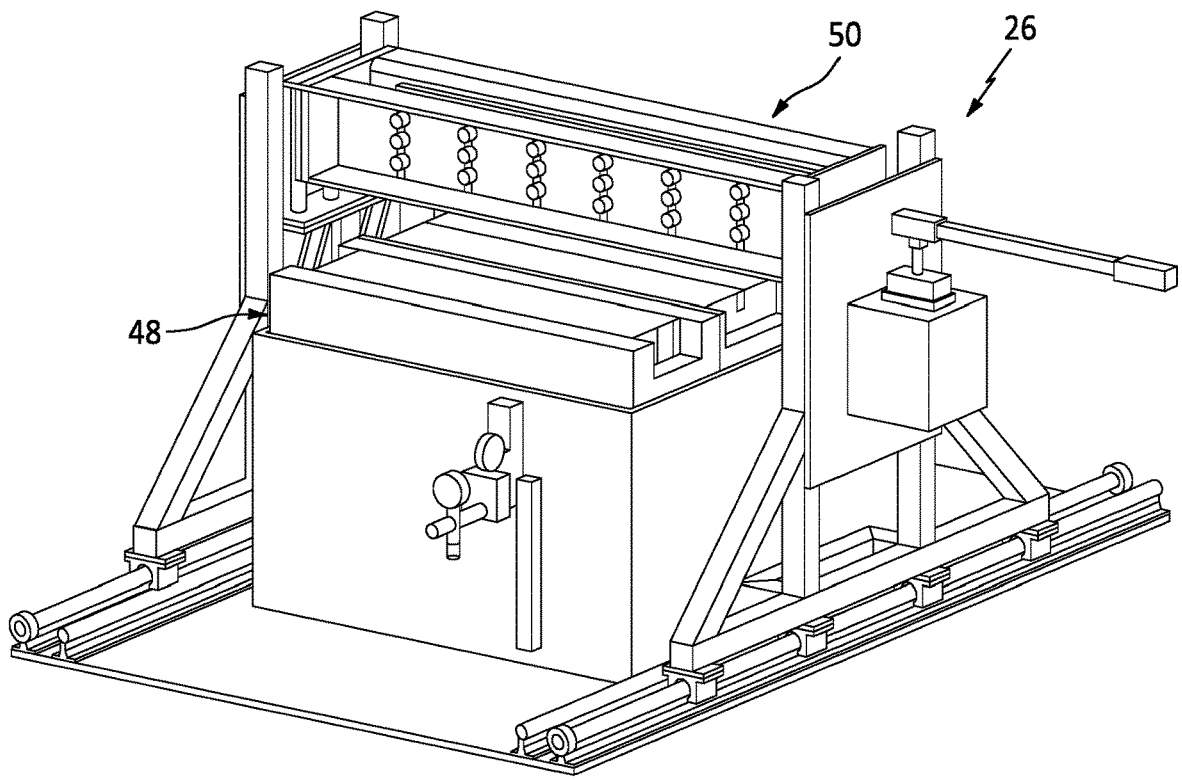
FIG. 16A is a perspective illustration of the induction welding fixture with a rectangular configuration.
Figure 16B:
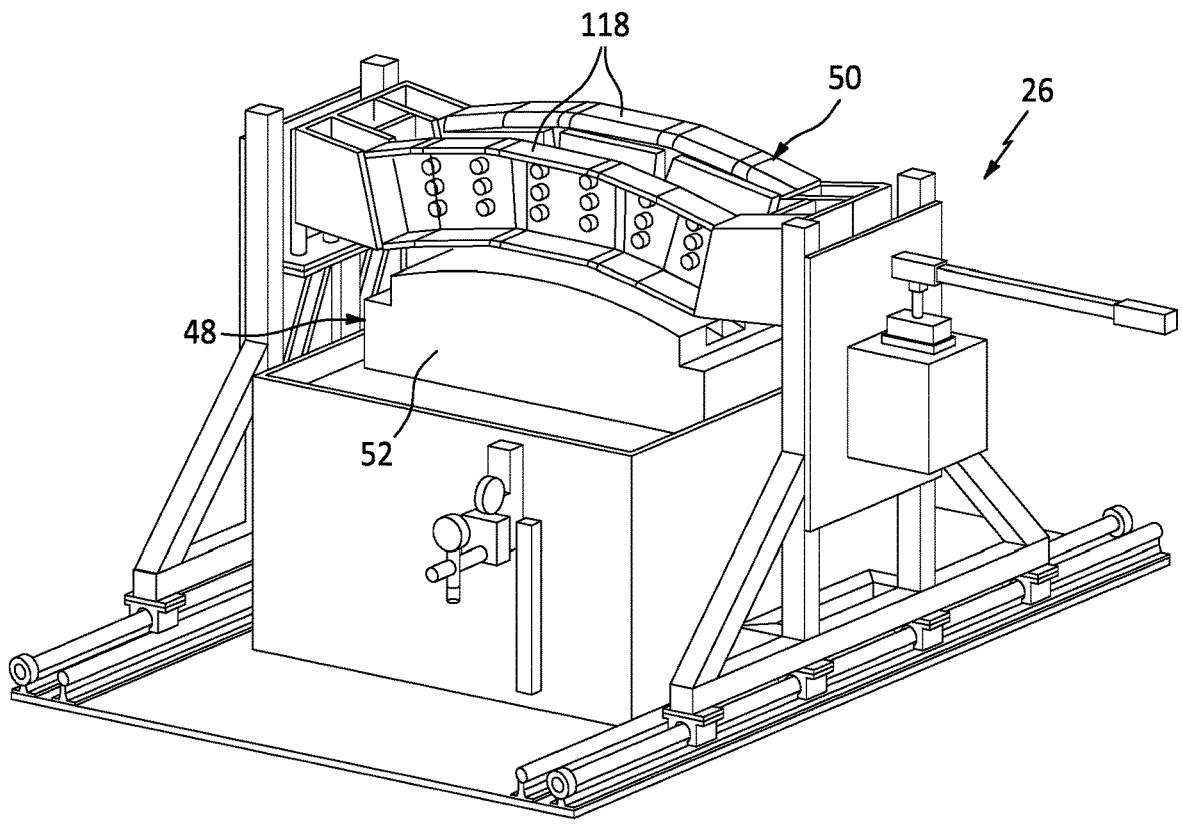
FIG. 16B is a perspective illustration of the induction welding fixture with a non-rectangular configuration.

In some embodiments, the induction welding fixture 26 may have a generally rectangular configuration as shown in FIG. 16A (see also FIG. 1). In other embodiments, the induction welding fixture 26 may have a non-rectangular configuration as shown in FIG. 16B. The induction welding fixture 26 of FIG. 16B, for example, may be particularly suited for induction welding curved (e.g., arcuate) workpieces. The beams 118 and/or the base 52, for example, may be curved or include curved portions.

The method 1200 and the induction welding system 20 of the present disclosure may be utilized for induction welding various different types and configurations of workpieces 22. For example, the workpiece 22 may be configured as a fan cowl for a nacelle of an aircraft propulsion system. The workpiece 22, however, may alternatively be configured as or may otherwise be included as part of another nacelle component, an aircraft control surface, a wing or an aircraft fuselage. The present disclosure, however, is not limited to induction welding and manufacturing such exemplary components or to aircraft propulsion system applications. For example, the method 1200 and the induction welding system 20 may be utilized for manufacturing any type or configuration of workpiece where two or more bodies (e.g., workpiece members 28) are joined together via induction welding.

Figure 17A:
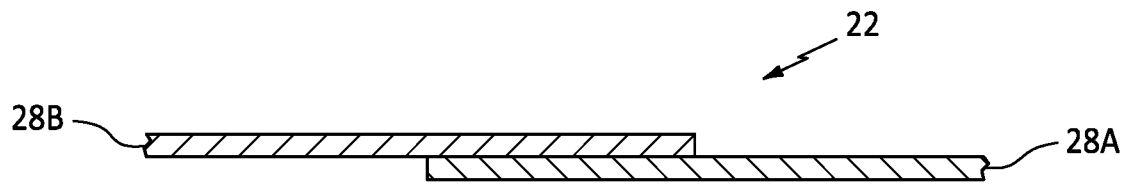
FIGS. 17A-17C are sectional illustrations of interfaces between various different workpiece members.
Figure 17B:
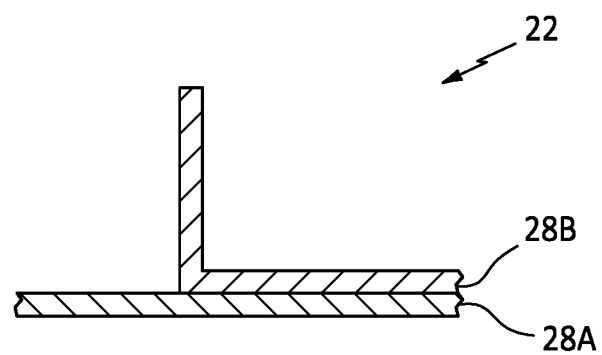
Figure 17C:
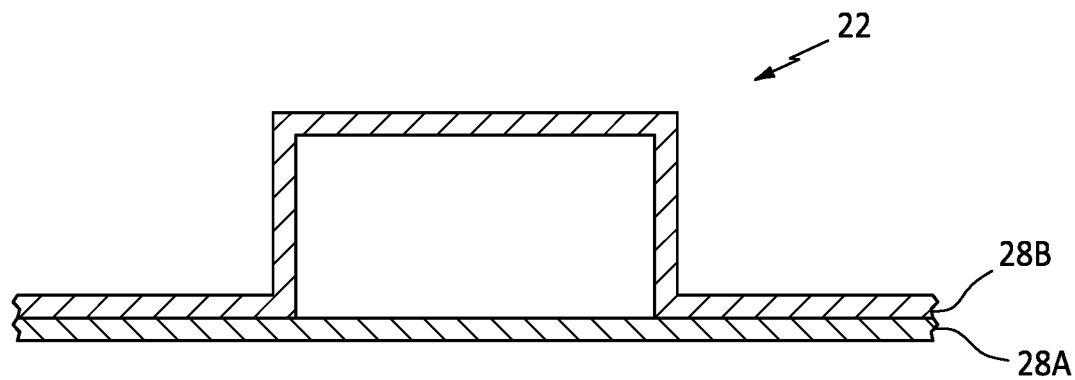

In some embodiments, referring to FIG. 17A, the workpiece members 28 may be configured as planar or non-planar (e.g., curved) sheets of material. In other embodiments, referring to FIGS. 17B and 17C, any one or more of the workpiece members 28 (e.g., 28B) may be configured with more complex (e.g., convoluted, bent, etc.) geometry. The workpiece member 28B of FIG. 17B, for example, is configured with an L-shaped cross-sectional geometry, for example, to provide the workpiece with a flange. The workpiece member 28B of FIG. 17C is configured with a channeled (e.g., top-hat shaped) geometry, for example, to provide the workpiece 22 with a stiffener, a mount and/or a channel. The present disclosure, however, is not limited to the foregoing exemplary workpiece member configurations.

Figure 18:
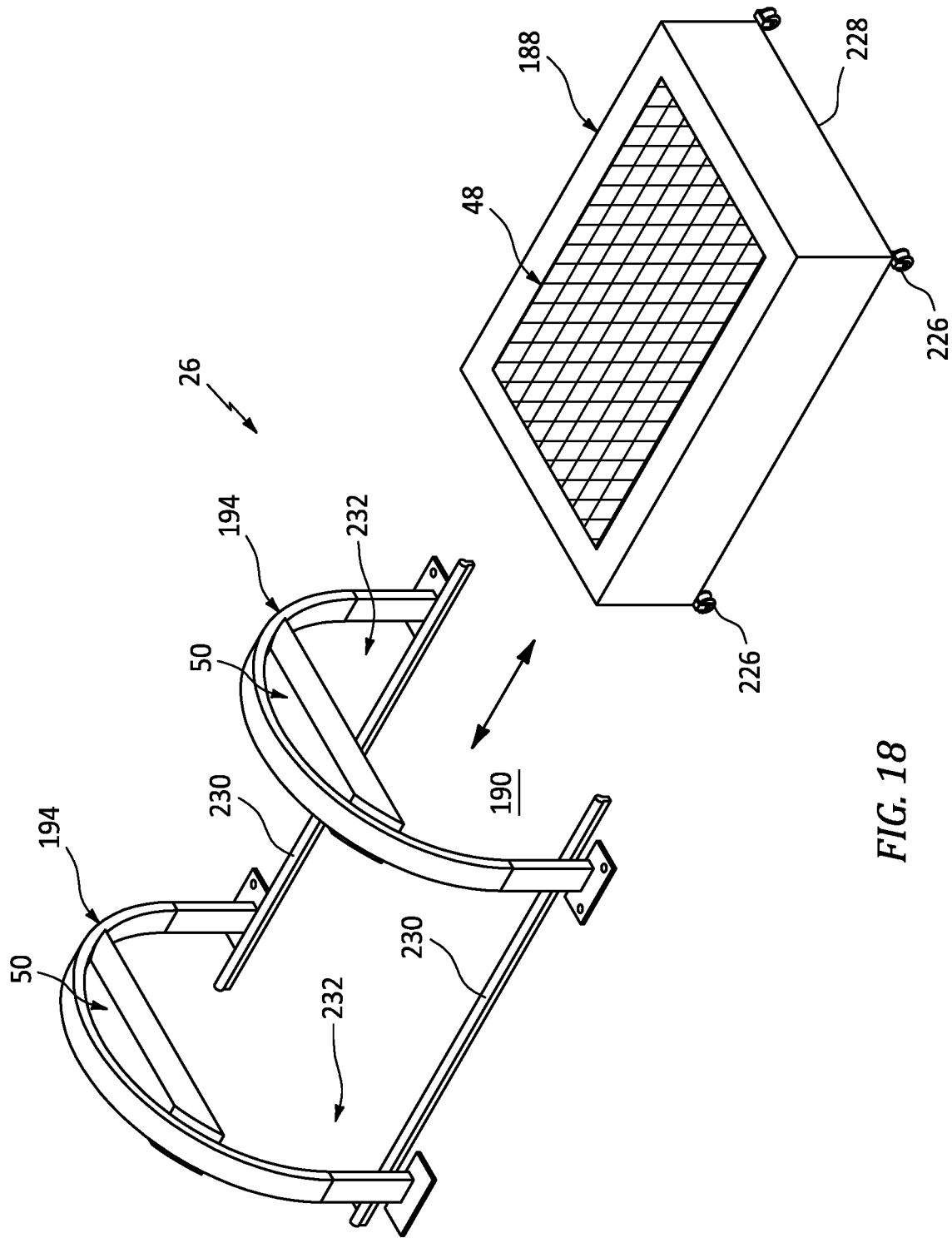
FIG. 18 is a schematic illustration of the induction welding system configured with a plurality of top support structures.

In some embodiments, referring to FIG. 18, the bottom support structure 48 may be configured as a mobile unit. The base structure 188 of FIG. 18, for example, includes one or more wheels 226. These wheels 226 are connected to the base structure 188 at a bottom surface 228 of the base structure 188. The wheels 226 may be operable to move freely on the floor 190. Alternatively, the wheels 226 may run on one or more tracks 230. With such an arrangement, the bottom support structure 48 may be moved within/into or out of a gentry tunnel 232 to provide additional adjustment and/or facilitate placement and/or removal of the workpiece (not shown in FIG. 18).

In some embodiments, the induction welding fixture 26 may include a plurality of the top support structures 50 (schematically shown in FIG. 18). Each of these top support structures 50 may be arranged with a respective gantry 194, where each gantry 194 may be fixed to the floor 190. With this arrangement, the top support structures 50 may be configured with different trunks 100 (see FIG. 5). The top support structures 50, for example, may be setup to align with respective portions of the workpiece (not shown in FIG. 18) with different geometries. A larger portion or an entirety of the workpiece may thereby be induction welded without requiring readjustment of a single top support structure 50. In addition or alternatively, different locations on the workpiece may be induction welded concurrently; e.g., simultaneously.

While the multiple gantries 194 shown in FIG. 18 are configured as fixed gantries, it is contemplated that one or more of these gantries 194 may alternatively be mobile. Each of the gantries 194 in FIG. 18, for example, may alternatively be configured to move along tracks 196 as shown, for example, in FIG. 11. Each gantry 194 and its respective top support structure 50 may thereby move relative to the bottom support structure 48 and/or relative to the other gantry 194 and its respective top support structure 50.

FIG. 18 illustrates the induction welding fixture 26 with two gantries 194 and two respective top support structures 50. It is contemplated, however, the induction welding fixture 26 may include three or more gantries 194 and/or three or more top support structures 50. Furthermore, while the induction welding fixture 26 is illustrated with a single base structure 188 and a single bottom support structure 48, the present disclosure is not limited to such exemplarily configurations. For example, in addition to or alternatively to including more than one gantry 194/more than one top support structure 50, the induction welding fixture 26 may also include two or more base structures 188 and/or two or more bottom support structures 48.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for induction welding, comprising:
   a fixture including a first support structure, a second support structure and a third support structure;
   the second support structure including a frame and a plurality of trunks, each of the plurality of trunks connected to and repositionable on the frame;
   the third support structure including a second frame and a plurality of second trunks, and each of the plurality of second trunks connected to and repositionable on the second frame; and
   the fixture configured to secure a workpiece vertically between the first support structure and the second support structure using the plurality of trunks during induction welding of the workpiece, and the fixture further configured to secure the workpiece with the third support structure using the plurality of second trunks during the induction welding of the workpiece.

2. The assembly of claim 1, wherein
   the first support structure comprises a heat management device configured to contact a first side of the workpiece;
   the second support structure further includes a heat sink configured to contact a second side of the workpiece; and
   the fixture is configured to secure the workpiece vertically between the heat management device and the heat sink.

3. The assembly of claim 2, wherein the first support structure further includes an actuator configured to push the heat management device against the workpiece for clamping the workpiece between the heat management device and the heat sink.

4. The assembly of claim 3, wherein
   the first support structure further includes a base; and
   the heat management device and the actuator are disposed within a channel in the base.

5. The assembly of claim 3, wherein the actuator comprises an expandable pressure vessel.

6. The assembly of claim 2, wherein the plurality of trunks vertically engage and provide a backstop for the heat sink.

7. The assembly of claim 1, wherein the fixture is configured to clamp a first member of the workpiece and a second member of the workpiece vertically between the first support structure and the second support structure using the plurality of trunks as the second member of the workpiece is induction welded to the first member of the workpiece.

8. The assembly of claim 1, wherein
   the frame includes a first beam and a second beam;
   the plurality of trunks include a first trunk and a second trunk, the first trunk is connected to and repositionable on the first beam, and the second trunk is connected to and repositionable on the second beam; and
   the first trunk is laterally separated from the second trunk by a channel configured to receive an induction welding coil for induction welding the workpiece secured between the first support structure and the second support structure.

9. The assembly of claim 1, wherein the plurality of trunks are arranged longitudinally along the frame.

10. The assembly of claim 1, wherein at least one of
    the first support structure has a first contact surface configured to contact a first side of the workpiece, and the first contact surface is flat; or
    the second support structure has a second contact surface configured to contact a second side of the workpiece, and the second contact surface is flat.

11. The assembly of claim 1, wherein at least one of
    the first support structure has a first contact surface configured to contact a first side of the workpiece, and at least a portion of the first contact surface is curved; or
    the second support structure has a second contact surface configured to contact a second side of the workpiece, and at least a portion of the second contact surface is curved.

12. The assembly of claim 1, further comprising an induction welding coil configured to induction weld a first member of the workpiece to a second member of the workpiece while the workpiece is secured vertically between the first support structure and the second support structure.

13. An assembly for induction welding, comprising:
    a fixture including a first support structure and a second support structure;
    the second support structure including a frame and a plurality of trunks, each of the plurality of trunks connected to and repositionable on the frame; and
    the fixture configured to secure a workpiece vertically between the first support structure and the second support structure using the plurality of trunks during induction welding of the workpiece;
    wherein a first of the plurality of trunks is connected to the frame by a quick release coupler and a fastener assembly;
    wherein the quick release coupler is configured for temporarily maintaining a vertical position of the first of the plurality of trunks where the fastener assembly is loose; and
    wherein the fastener assembly is configured to fix the vertical position of the first of the plurality of trunks during the induction welding of the workpiece.

14. An assembly for induction welding, comprising:
    a fixture including a first support structure and a second support structure;
    the second support structure including a frame and a plurality of trunks, each of the plurality of trunks connected to and repositionable on the frame;

the fixture configured to secure a workpiece vertically between the first support structure and the second support structure using the plurality of trunks during induction welding of the workpiece; and a gantry comprising the second support structure.

15. An induction welding method, comprising:

arranging a fixture and a workpiece together, wherein the fixture includes a first support structure, a second support structure and a third support structure, the second support structure includes a frame and a plurality of trunks, each of the plurality of trunks is connected to and repositionable on the frame, the third support structure includes a second frame and a plurality of second trunks, and each of the plurality of second trunks is connected to and repositionable on the second frame;

securing the workpiece vertically between the first support structure and the second support structure using the plurality of trunks, and further securing the workpiece with the third support structure using the plurality of second trunks; and induction welding a first member of the workpiece to a second member of the workpiece using an induction welding coil while the workpiece is secured vertically between first support structure and the second support structure and while the workpiece is secured with the third support structure.

16. The induction welding method of claim 15, wherein the induction welding coil is located in a gap laterally between a first of the plurality of trunks and a second of the plurality of trunks.

17. The induction welding method of claim 15, wherein the induction welding coil translates longitudinally along a row of the plurality of trunks while induction welding the first member of the workpiece to the second member of the workpiece.

18. The induction welding method of claim 15, wherein the securing of the workpiece comprises adjusting a vertical position of at least a first of the plurality of trunks.

* * * * *